(12) United States Patent
Masten, Jr.

(10) Patent No.: US 10,870,588 B2
(45) Date of Patent: Dec. 22, 2020

(54) METHOD AND APPARATUS TO IMPLEMENT A MANAGED DISTRIBUTED WASTEWATER PROCESS

(71) Applicant: James William Masten, Jr., Seattle, WA (US)

(72) Inventor: James William Masten, Jr., Seattle, WA (US)

(*) Notice: Subject to any disclaimer, the term of this patent is extended or adjusted under 35 U.S.C. 154(b) by 649 days.

(21) Appl. No.: 15/633,729

(22) Filed: Jun. 26, 2017

(65) Prior Publication Data
US 2018/0370814 A1 Dec. 27, 2018

(51) Int. Cl.
| | |
|---|---|
| *C02F 1/00* | (2006.01) |
| *C02F 1/78* | (2006.01) |
| *C02F 1/72* | (2006.01) |
| *E03F 7/00* | (2006.01) |
| *E03F 3/02* | (2006.01) |
| *E03F 1/00* | (2006.01) |
| *C02F 103/00* | (2006.01) |
| *E03F 3/00* | (2006.01) |
| *C02F 1/56* | (2006.01) |

(52) U.S. Cl.
CPC .............. *C02F 1/008* (2013.01); *C02F 1/006* (2013.01); *C02F 1/727* (2013.01); *E03F 1/007* (2013.01); *E03F 3/02* (2013.01); *E03F 7/00* (2013.01); *C02F 1/56* (2013.01); *C02F 1/78* (2013.01); *C02F 2103/002* (2013.01); *C02F 2103/005* (2013.01); *C02F 2209/006* (2013.01); *C02F 2209/008* (2013.01); *C02F 2209/03* (2013.01); *C02F 2209/40* (2013.01); *C02F 2209/42* (2013.01); *C02F 2209/44* (2013.01); *C02F 2307/08* (2013.01); *E03F 3/00* (2013.01)

(58) Field of Classification Search
CPC .......... C02F 1/008; C02F 1/006; C02F 1/727; C02F 1/56; C02F 1/78; C02F 1/00; C02F 1/72; C02F 2307/08; C02F 2103/005; C02F 2103/002; C02F 2209/006; C02F 2209/008; C02F 2209/03; C02F 2209/40; C02F 2209/42; C02F 2209/44; E03F 1/007; E03F 3/02; E03F 3/00; E03F 7/00
USPC ......................................................... 210/739
See application file for complete search history.

(56) References Cited

U.S. PATENT DOCUMENTS

2011/0210049 A1* 9/2011 O'regan, Jr. ....... G05B 19/4185
210/85

\* cited by examiner

*Primary Examiner* — Robert Clemente
*Assistant Examiner* — Akash K Varma

(57) ABSTRACT

The method of the managed sewer is a "Netcentric" distributed process that is managed in real-time and implemented through several apparatuses that enable the low capital cost and low installation cost of a smaller diameter pipe (smaller than typically used in gravity flow systems). The apparatuses enable the method of managing the grinding, pumping and staging processes to optimize the effectiveness of the collection process through the small pipe and increase system efficacy by using the pumping and transport action of the material in the pipe as part of the process activity.

11 Claims, 4 Drawing Sheets

METHOD AND APPARATUS TO IMPLEMENT A MANAGED DISTRIBUTED WASTEWATER PROCESS

BACKGROUND OF THE INVENTION

The history of urban sewer systems starts more than 5,000 years ago. There is preserved evidence of clay pipes and indoor plumbing for baths with both hot and cold water and flush water toilet facilities in several ancient archeological sites. Common to most of these ancient systems, whether flush or continuous flow in design, was the gravity-powered movement of the waste material to a river, lake, pond or the sea. Previous systems may have existed but we have no preserved evidence of such systems.

In the middle ages indoor facilities were common but just usually ran into holes under the floor. In the 1800's, the western world moved away from outhouses built over holes of convenience to indoor plumbing, and the gravity flow septic tank and drain field system were developed. In temperate climates the anaerobic processes active inside the septic tank convert the sewer solids to methane and heat. But these systems require a significant physical area over which to drain process liquids into the ground for further processing.

As population densities have increased, larger communal systems have developed which employ anaerobic processing but also make extensive use of complex gravity flow piping to collect the flow from thousands to hundreds of thousands of residences. The gravity flow systems are complex and expensive. The piping diameters have to grow significantly as the system adds users because gravity flow is slow. The trench becomes prohibitively deep on long runs requiring electric, fuel powered or steam powered "lifting" stations to be added to bring the flow to the surface so that another gravity run can start.

Recently, pumped-flow sewer systems have become common but all operate on a pumping cycle that is determined by the actual input volume. The tank is usually fitted with a float and when the level inside the tank fills up, the float triggers the pump to push the tank contents into a much larger common pipe which is typically gravity flow and uses lift stations as required.

After 5,000 years of evolution, gravity flow sewers collecting to anaerobic biological processes have not significantly changed. The development of permeable membranes has enabled a reduction in unprocessed floc material penetration of the soil and a more thorough anaerobic reduction. But the anaerobic production of methane is proving itself a significant source of "greenhouse" gas, attacking the earth's protective ozone layer.

Newer systems make use of ceramic membranes and high pressures in a "reverse osmosis" process which employs high volumes of circulating air to cultivate oxygen based (aerobic) biological processes which are minimally destructive to the atmosphere.

Recent interest in mechanical separation has seen innovations such as disclosed in U.S. Pat. No. 6,811,713, which presents a multi-grooved ring enabling multiple high energy fluid or gas injectors to significantly increase the radial velocity of a centripetal separator. This system uses high pressure fluids, which could include air or other gases to accelerate fluid containing solids in suspension, in collision flows to separate out the solids and liquids from the gas which is released. This is a non-thermal solids separation process.

Although not developed to directly act in support of mechanical separation, U.S. Pat. No. 7,553,447 reveals a method for injecting ozone into forced mains as a means of reducing the concentrations of hydrogen sulfide.

A patent with a similar ambition is U.S. Pat. No. 6,447,720 which uses very high-output ultraviolet lights, arranged externally relative to a vertical pipe flow, that exposes a large surface area with a very limited depth at the edges as the flow overflows at the circumferential edge of the pipe. This physical arrangement and the high power of the light act together to kill all bacteria almost instantly.

U.S. Pat. No. 7,080,686 B2 by inventor Beckhardt teaches a method of using "P" traps and "J" traps as valves along with pressurized liquid and gases to to pick up and transport high solid content liquids. This unique patent avoids the complexities of using vacuum valves with gritty semi-solids or high solid content liquids.

U.S. Pat. Nos. 7,624,892, 8,297,466 and 8,746,492 by inventor Daley disclose a unique self anchoring buffer storage tank intended to withstand flood waters while retaining connectivity to input and output piping and providing operating platforms for grinder pumps.

U.S. Pat. No. 9,150,799 B2 is a disclosure by inventor Jan Michalek that reveals a complete system to process Municipal Solid Waste (MSW) through an Autoclave to gasify the MSW and produce cellulose gas to fuel a turbine and use the heat of the turbine exhaust to create the steam for the autoclave while making product electricity as a zero-emissions process.

Inventor Paul Culler reveals in U.S. Pat. No. 9,512,023 B1 the insightful application of a three-output Richter separator to process municipal waste water to solids prepared to be dehydrated by screw compressor and low solids water ready for membrane filtering. This patent reveals a purely mechanical process for processing sewer water without biological processes in a physically small system.

In all of the above referenced patents, each presents a different method and/or apparatus for collecting, transporting and/or processing waste material which could be municipal waste water or sewer water. What this inventor intends with the included broad spectrum of references is that current practice does not incorporate "netcentric awareness" to optimize a distributed process of collecting, preparing or transporting the wastewater or sewer water to a processing facility.

The managed wastewater collection and processing system disclosed herein constitutes a break with past evolutionary processes. This managed wastewater collection and processing system capitalizes on embedded computerized control of collection and preliminary processing for delivery to a wastewater processing facility.

BRIEF SUMMARY OF THE INVENTION

This disclosure reveals the method of a "managed sewer" which, as a "Netcentric" technology, uses a network to optimally distribute the process functionality throughout the system. The distribution of the process functionality incorporates the travel time in the pumped pipe collection system as "process dwell time" in the waste collection and processing system. Thus, costs are reduced where idle tank time is traded for "process-in-transit" time as the materials are pumped from collection to final processing.

The method significantly reduces capital costs in the re-fitment of existing facilities on septic tanks when implemented with the consideration of cable TV and Internet access as extended facilities common in all communities of the current age.

The construction of new communities or individual structures is also positively impacted by this method as one trench can be cut or one horizontal duct can be "drilled" and the separate pipes and conduits can be implemented inside one larger or even two separate but larger conduit or pipe raceways.

This invention supports the obvious trend of today's society: the network extends everywhere and current utilities are moving to become "netcentric."

The apparatus and method disclosed herein distributes reclaimed process water in a "purple pipe" for agricultural use but also distributes reclaimed water that has been bolstered with disinfectant anti-growth chemicals and floc affinity polymers to the pickup point macerator pumps where ozone is incorporated into the maceration process to aid sterilization.

After the maceration and sterilization process, the material is pumped using a coordinating algorithm to optimize the efficacy of using a consistent and relatively small diameter pipe deployed by either horizontal drilling or direct burial below the frost line. The method of a managed sewer employs a process to monitor and control an apparatus consisting of a system of distributed valves and sensors along with monitoring and control electronics.

The method of the managed sewer monitors the status of the buffer tanks at each residence (or pickup point) distributed throughout the system to know which require pumping. The managed sewer method then controls the valves and pumps sequentially to optimize the utilization of the small diameter piping by allowing individual tanks to empty in turn and allowing high speed transport of the sewer materials to the processing facility. The equivalent of "lifting" stations is deployed, but the size of the interconnecting pipes is consistently small diameter piping with proportionally reduced pump power requirements.

Additionally, the turbulent transport time in the pipe optimally "treats" the pathogens in the waste with ozone exposure, while the flocculation polymers gain optimal access to the microscopic components that otherwise would resist separation by mass.

The method of the "managed sewer" includes the knowledge of the accumulated history of typical and expected flow from each residence or wastewater source. This knowledge allows the algorithm of the method to anticipate and execute a schedule that efficiently and effectively moves the waste through the system to a processing center through a small diameter low pressure piping system.

Unlike existing systems that pump when the wastewater level in the receiving tank at the collection point reaches a predetermined level; the managed sewer method will pump fractionally filled receiver tanks in order to spread out peak collection cycles and optimize the utilization of the small diameter pipe.

The managed sewer method enables the utilization of small diameter piping for the entirety of the sewer piping system from collection to the processing center, allowing for a dramatically reduced cost factor. Small diameter pipes cost less than larger diameter pipes and smaller pipes enable lower cost horizontal drilling or a narrower trench cut from the surface.

The "backend" processing structure of the managed sewer is a simplified mechanical filtering process, since the waste material arrives as screened, sterile, fine particulate that can be readily processed away from the water component through physical separation techniques and distillation.

| Reference Markings | Description |
|---|---|
| 1 | Purple water pipe for agricultural and fire suppression application |
| 2 | Low-voltage communications, including dedicated fibers for Internet, broadcast television and local network connectivity |
| 3 | AC Power distribution |
| 4 | Wastewater out, ground through macerator pump, mixed with high floc affinity polymer and Ozone treated |
| 5 | Property Line isolation/distribution equipment (PLI) |
| 6 | Macerator/grinder pump (typical) low pressure, 45 psi nominal |
| 7 | Single station buffer tank and equipment housing (SSBT) |
| 8 | Residence wastewater output carried in 4-inch (typical) pipes |
| 9 | Purple water output faucet |
| 10 | Internet router and television antenna cable |
| 11 | Residence (typical) |
| 12 | Treated (processed) water with high affinity floc polymer added |
| 13 | Access to outside air though check valve |
| 14 | Ozone injectors |
| 15 | Ozone generator |
| 21 | Internet Cloud Interface |
| 22 | Wastewater Processing facility and Power Generation/Distribution |
| 23 | Sewer System Network Operations Center (NOC) |
| 24 | Purple Water buffer storage tank (e.g., fire water storage) |
| 25 | Fire Hydrant |
| 30 | Smart System branch circuit valve (SSBV) |

DETAILED DESCRIPTION OF THE INVENTION

The method of the managed sewer is a distributed process which transforms sewer wastewater to a sterile benign product without using biological reduction, therefore eliminating the creation of any methane and/or hydrogen sulfide.

Figure 1:
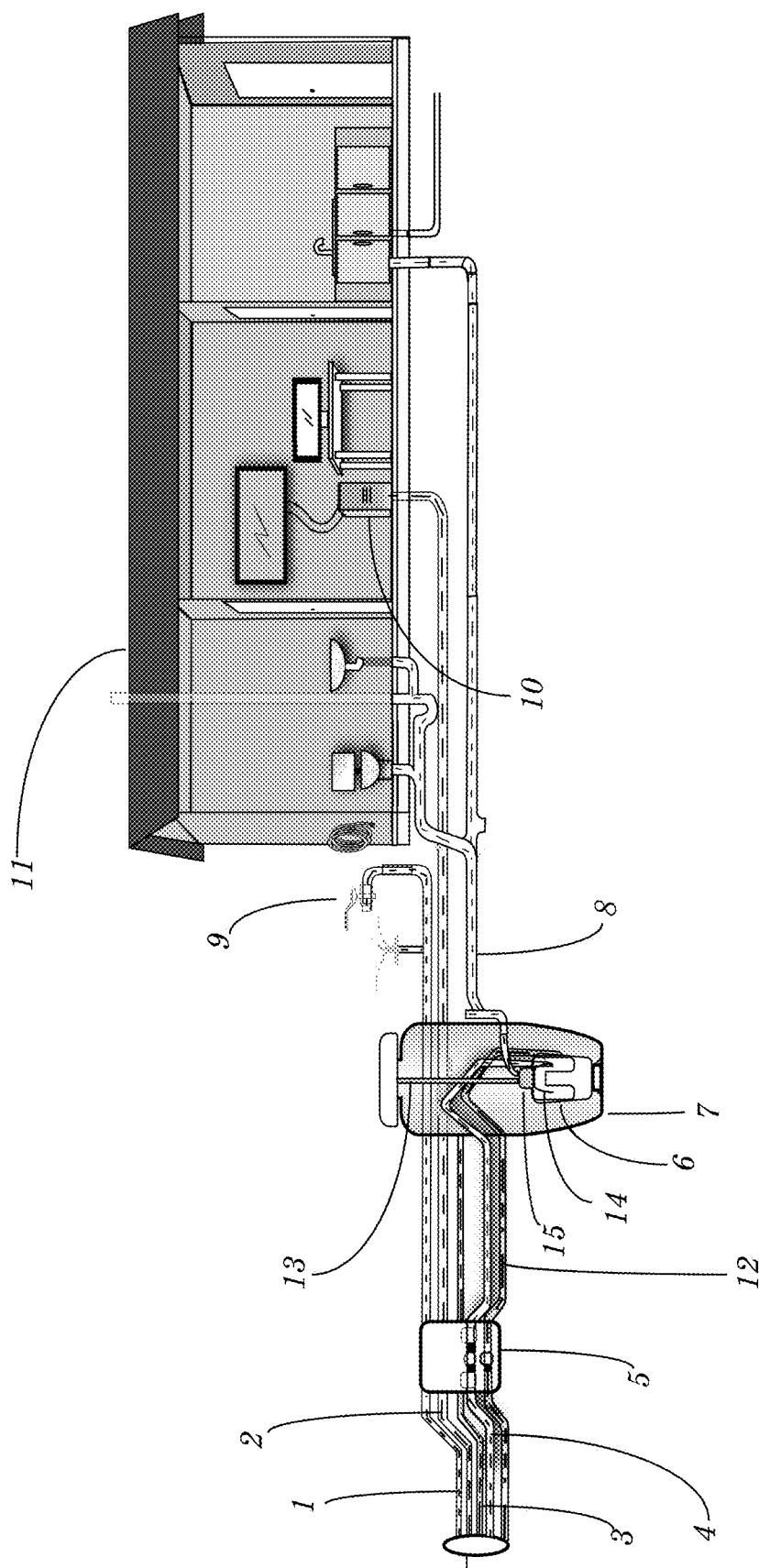
FIG. 1 reveals a typical residence or pick-up point with local buffer tank and pumping system along with network and piping connections.
Figure 2:
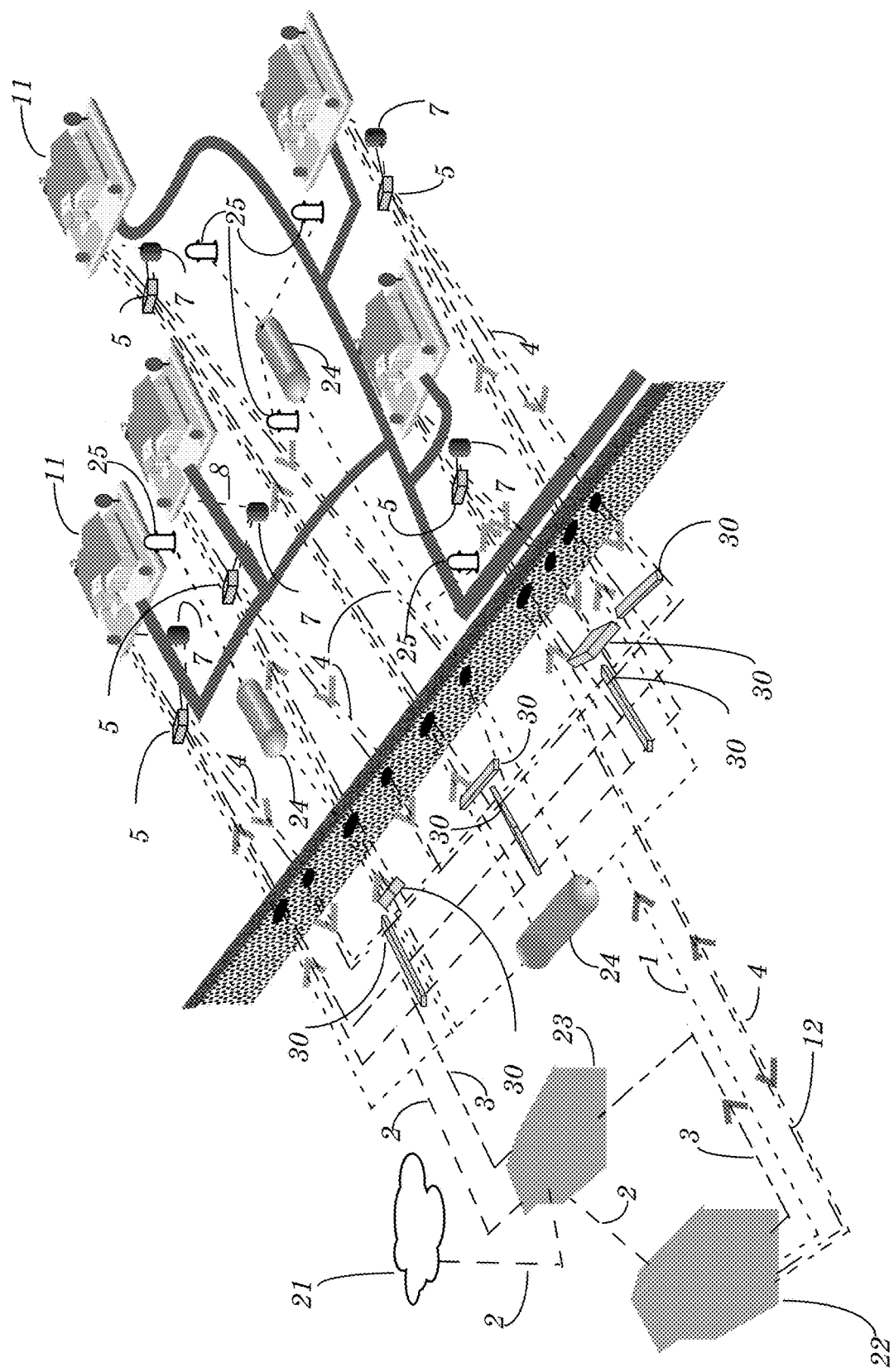
FIG. 2 shows a layout of a typical residential community of pick-up points, processed water storage tanks, wastewater, processed water, power and network piping and conduits.

The managed sewer method is enabled by a series of unique apparatus that deploy novel technologies along the distributed piping path. As shown in FIGS. 1 and 2, the Single Station Buffer Tank and equipment housing (SSBT) 7 receives the waste material from the residence 11, or commercial/industrial facility. The SSBT 7 serves several functions. The SSBT enables the immediate sterilization of the wastewater, eliminating any hydrogen sulfide and/or methane production during the wastewater transportation or treatment process. The SSBT provides a storage buffer allowing the optimized pumping of material to maximize the utility of the small diameter connection pipe. The waste material 8 is first ground to a fine particle by the macerator pump 6. Simultaneous with the pumping and grinding action is the injection of ozone 14 to kill all pathogens in the waste material. The ozone generator 15 uses atmospheric air collected through a directional valve-equipped duct 13. During the pumping action the waste material 8 is diluted with high floc affinity polymer-laced reprocessed water 12 incorporating a disinfectant and sent to the buffer tank from the central processing facility 22.

The backbone of the managed sewer system is the enabling network. The sewer system network is a truly integrated utility that enables the new technology sewer process and also delivers Internet and local television through a master channel cable TV antenna system as a component of the sewer processing facility. These additional services are distributed to the sewer subscribers as a sewer feature. The delivered features significantly support the value received by the subscribers.

The managed sewer process is implemented through a series of embedded processors and smart switches (disclosed in Provisional Patent application No. 62/354,630), located within the Single Station Buffer Tank and equipment housing SSBT 7, the Property Line Isolation/distribution equipment (PLI) 5 and the Smart System Branch circuit valves (SSBV) 30. An important aspect of the managed sewer method is the apparatus of the smart switches which detect and alert the Network Operations Center (NOC) 23 as to any Ground Fault, Arc Fault or Over-Current condition occurring in any individually switched embedded electrical hardware.

Each of the embedded pumps or valves is either redundant in function by co-located replicated hardware or is functionally replicated in the extended system architecture. This feature enables continued operation and the dispatch of field repair as a normal operational activity. Additionally, the SSBT 7, the PLI 5 and the remote valves SSBV 30 contain a plurality of sensors including valve position status, current monitoring of all motors and switches, flow rates and pressures. The local processing of these sensors provides full system and specific device status and characterization to the NOC 23. The incorporation of redundant distributed processors enables a level of autonomous control to continue operations when communication is slow or problematic.

The method of the managed sewer incorporates the optimization of the installed facility by using a consistently smaller pipe (versus traditional gravity flow systems) which reduces initial capital costs as well as installation costs, by enabling the use of horizontal drilling or narrow trenching to install separate dedicated ducts for power, wet products and low-voltage communications. The installed ducts provide routing for the pipes containing the remotely treated wastewater 4 collection, AC power distribution 3, processed water 1 (i.e., purple pipe water) for agriculture and fire suppression, processed and prepared water 12 for use as a distributed floc collection aid, and fiber optic cables 2 distributing system network, Internet and broadcast television to the sewer system clients.

Key to the reliability and robust operation of the managed sewer is the controlled distribution of AC power 4. The system uses grid-supplied power as primary resource and self-generated power as back up or as a supplement when required. Power is routed for distribution from the sewer processing/power routing/generating facility 22 to the NOC 23 and out to the system wide switching 5 nodes, pumping nodes 7 and the system branch nodes 30.

The system does not rely on power delivered from the subscribing residences. All power 3 required to operate the system is under system control and management. As such, the system of distributed power 3, with its own back up power, is more resilient than a system relying on client-sourced power at the connecting nodes.

The managed sewer system is networked on an isolated fiber optic network 2 which enables managed control from a redundant set of servers located in the NOC 23.

Although the Internet Cloud connection 21 is connected to the NOC 23, isolation and buffering through a network router and system firewall 10 are provided as an interface for Internet distribution to the subscribing clients' residences 11.

The managed wastewater treatment system makes optimum use of smaller piping by exploiting the capabilities of the SSBT 7 and the functionality of the PLI 5. The SSBT 7 is equipped with capacitive sensors which accurately measure the level of the wastewater collection in the tank. By controlling the valves of the PLI 5, the process controllers as commanded by the NOC 23 are used to isolate a direct pumping line from an individual SSBT 7 macerator pump 6 to the process facility 22. The control computers in the NOC 23 analyze in real-time the system-wide wastewater levels in the aggregate 7 tanks and develop adaptive schedules to distribute the pumping activity over the full day. This is a process which anticipates any "surge" requirements, by dissipating the volume over the smaller pipes and a longer flow time.

Unlike conventional gravity flow collection or low pressure collection sometimes used in traditional biological processing systems, the managed sewer wastewater collection system delivers the wastewater 4 to the processing center 22 with the solids ground to a fine particle size by the macerator pump 6, treated with high floc affinity polymers 12 and disinfected with pathogen-killing ozone 14.

The method is built on a set of predefined pumping maps and schedules for each branch pipe circuit 30 such that the most distant buffer tank 7 will be pumped first and flushed with clean processed recycled water 12. The clean processed recycled water is buffered in large storage tanks 24. These tanks provide a field reserve for those communities where this system provides reservoir fire suppression water 24 for the locally distributed fire hydrants 25. These large buffer tanks can also be fitted with output faucets 9 to support legitimate agricultural use. The SSBV 30 also meters the returned processed waster 1 (e.g. purple pipe water).

The wastewater 4 will be pumped from the farthest buffer tank 7 and back-filled with processed water 12 to the smart system branch circuit valve SSBV 30 or the property line instrument and valve PLI 5. All valves, 5, 7 and/or 30 which have been pumped clean will then be closed and the next buffer tank 7 in line will be pumped and the process repeated until the entire branch pipe system 30 is filled with clean processed water 12.

When the most distant branch piping circuit 30 is pumped and filled with clean processed water 12, the next most distant branch circuit 30 will be pumped using the specific pumping map created for that branch circuit. This process is repeated until all of the branch circuits 30 have been pumped.

The method builds on a live data map supported by the high-speed managed sewer system local network 2. The data map includes SSBT 7 fill factors, which are the processed histories of each individual collection point be it a residence or an industrial/commercial facility. The method uses this data to compute pipe loading and sequential scheduling as a basis for controlling and sequencing the property line isolation valves PLI 5 and the smart system branch circuit valves SSBV 30. Included in the scheduling analysis is the computation of the quantities of prepared reprocessed water 12 allocated to each SSBT 7. The prepared reprocessed water 12 is used to flush each SSBT 7 and chase or flush each connected pipe route used to move the wastewater 4 from the SSBT 7.

Figure 3:
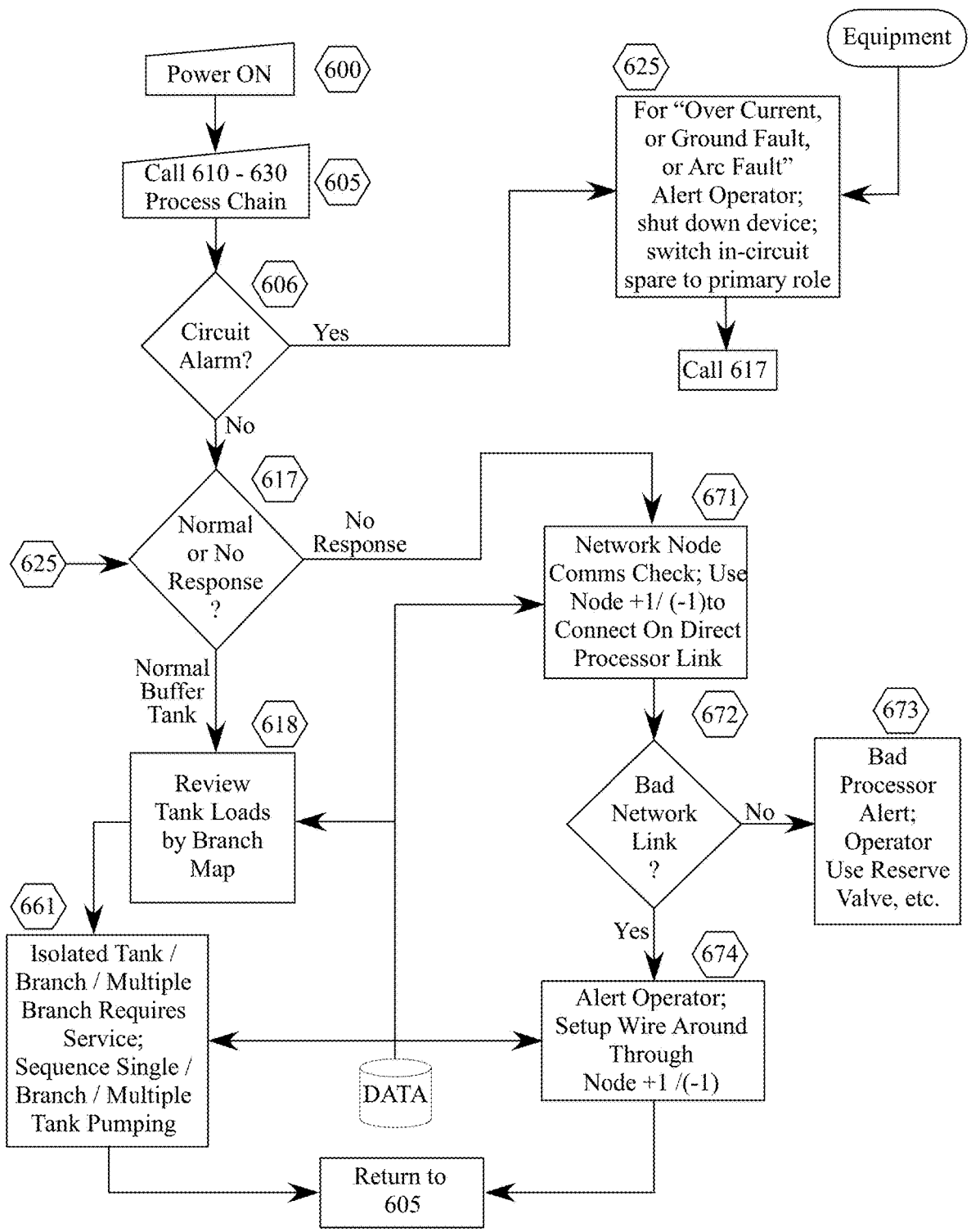
FIG. 3 presents a process distribution and functional flow diagram.
Figure 4:
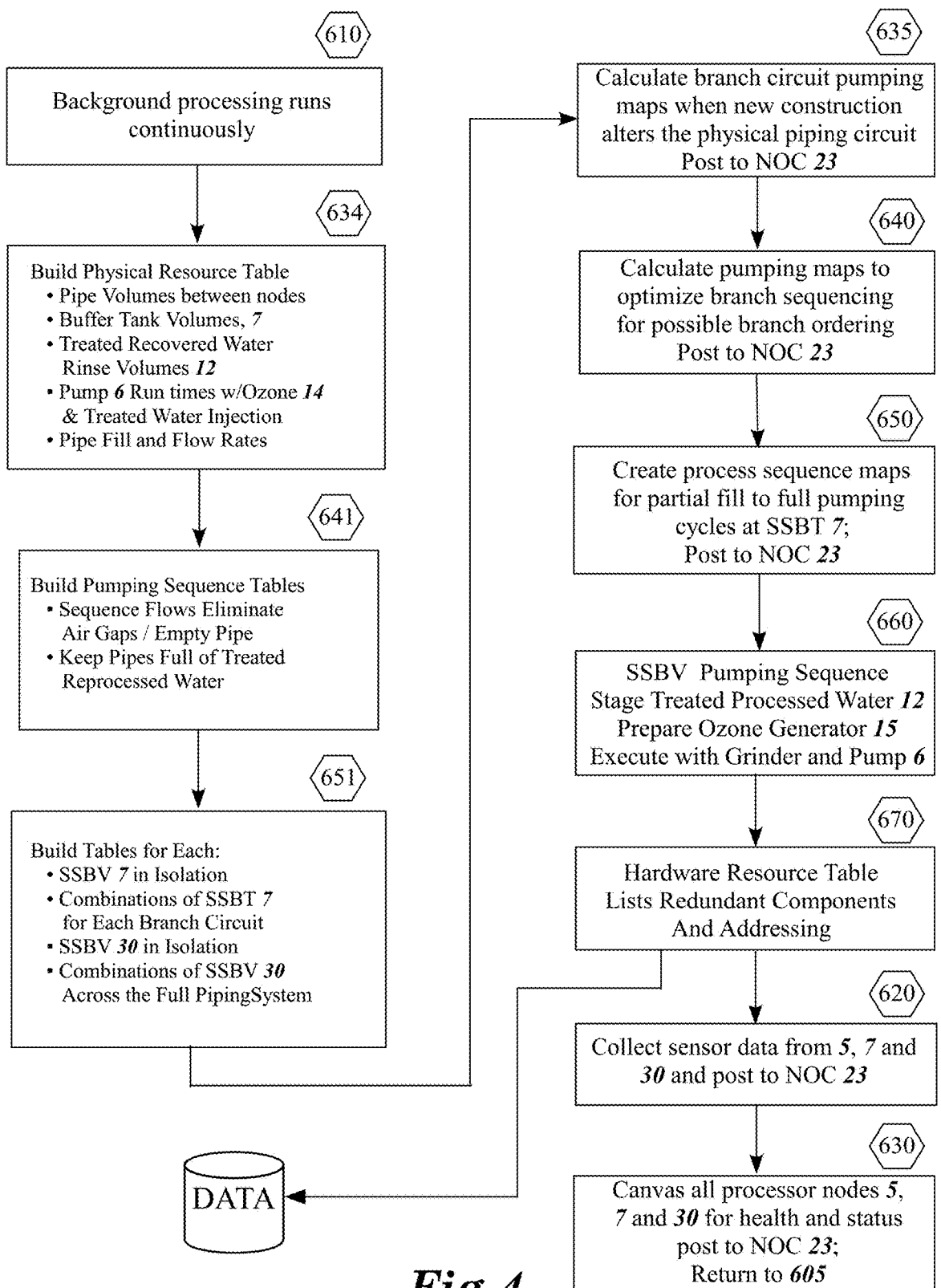
FIG. 4 shows background processing functions and data storage references in support of the distributed processes implementing the control and process functionality of the Managed Sewer shown in FIG. 3.

The method is characterized in the process flow diagrams FIGS. 3 and 4. The method is implemented as a series of data-driven processes in three classes. The physical class is run uniquely at the completion of construction to set up the table of physical resources 670, 635. This includes processes 634 that translate pipe lengths and diameters into storage volumes and pumping pressures and flow rates into volume rates. From these data tables, process 641 from the physical class computes fractional and total flows to pump out the wastewater and flush out a SSBT 7 and fill the connecting pipe with treated reprocessed water 12. Processes 650 and 651 of the physical class calculate the SSBT 7 sequence maps within a branch circuit as a function fill volumes for each SSBT 7 in the branch. Additionally, process 640 calculates the optimal branch circuit pumping order to minimize pumped volumes of treated reprocessed water and pumping energies.

The timing tables of process 660 build on the data of the other processes of the physical class. Process 660 builds the specific timing tables that provide supplemental structure to the real-time control models of the data-driven class of processes. The timing tables of process 660 define the backstop limits to the functional processes that execute to move wastewater from the SSBT 7 to the processing facility 22 in response to demand requirements. The SSBT 7 uses a capacitive sensor strip (not shown) embedded in the polyethylene housings and shielded from ground water on the soil side of the tank. The strip extends down the side of the tank which allows the local processor to make precise measurements as to the fill level of the SSBT 7. The method uses the timing schedules of process 660 to drive the appropriate pumping cycle, considering the fill rate of each SSBT 7, and preconditions the ozone generator 15 of each SSBT 7 to charge the ozone injectors 14 to deliver ozone to the grinding/pumping cycle of each macerator pump in conjunction with emptying the SSBT 7. As the tank level falls, the data-driven class process 661 will then release a measured flow of treated reconditioned water 12 to the SSBT 7 to flush the grinder/pump machinery and to back-fill the branch piping from this particular SSBT 7 to the PLI valve 5 and possibly to the SSBV 30, depending on the pumping sequence.

Processes 610 and 620 represent the concurrent class of processes that run at startup 600 and then periodically in the background to provide continuous status data on the operability of the communications and embedded processor resources. Such processes also provide evaluation data on the wastewater processing facilities by monitoring residual pressure decay in the pressurized pipe segments left full of treated reprocessed water between operational cycles.

The principal program loop 605 supporting the managed sewer method is characterized as the data-driven class of processes beginning with process 606 which evaluates and responds to alarm conditions from the class of processes 625 which deals with electrical circuit safety alarms. These processes automatically break down equipment failures to a set of general testable conditions related to electrical power distribution and are important because of life safety considerations. These processes also facilitate switching to backup hardware to maintain operational consistency.

Data-driven process 617 accepts the backup hardware into the normal equipment operational schedules or drives the search for the cause of the alarm condition to evaluate the communications channels. This search is facilitated by processes 671, 672, 673 and 674 to attempt a communications workaround using local channels between remote processors as a means of communicating to peripheral devices to which direct communications has failed.

Processes 618, 661 are the main functional data-driven processes of the data-driven process class. These processes perform the work of "servicing" the remote wastewater tanking 7 in the various embodiments of single tank, branch circuit with multiple tanks or multiple branches with multiple tanks. These processes make use of the equipment schedules created by the physical class of processes and the timing and application tables of the concurrent class of processes to optimize the managed sewer system.

What is claimed in this disclosure is:

1. A method for processing wastewater using a managed sewer system, the method comprising:
   receiving wastewater from a plurality of structures at a respective plurality of buffer tanks each coupled to a wastewater processing facility through a common pipe;
   within each buffer tank, adding a sanitizing agent into the wastewater;
   agitating the wastewater with the sanitizing agent by macerating the wastewater;
   measuring an amount of wastewater stored in each of the plurality of buffer tanks; and
   maintaining a constant flow through the common pipe to the wastewater processing facility by selectively activating pumps at each of the buffer tanks.

2. The method of claim 1, wherein maintaining the constant flow further comprises selectively activating a plurality of valves that control flow through wastewater pipes between the buffer tanks and the wastewater processing facility.

3. The method of claim 2, wherein the pumps are selectively activated by control signals sent from a control center.

4. The method of claim 3, further comprising:
   providing operating power to each buffer tank from the control center.

5. The method of claim 4, further comprising:
   monitoring the supplied operating power for arc fault and ground fault conditions.

6. The method of claim 5, wherein the control center is the wastewater processing facility.

7. The method of claim 1, further comprising:
   adding a flocculation polymer to the wastewater, wherein agitating the wastewater includes agitating the flocculation polymer.

8. The method of claim 1, further comprising:
   separating a first portion of the sanitized wastewater into a separate flow from the wastewater;
   pumping the first portion of the sanitized water to a storage tank; and
   recycling the first portion of the sanitized water in the storage tank.

9. The method of claim 8, wherein recycling the first portion of the sanitized water includes flushing the buffer tank with the recycled water after removing the macerated wastewater.

10. The method of claim 9, further comprising:
    flushing a pipe that carries the wastewater to a property-line isolation valve with the recycled water.

11. The method of claim 10, wherein each of the buffer tanks is flushed with the wastewater, the buffer tanks are located at different distances from the wastewater processing facility, and instructions from a control center cause the buffer tanks to be flushed in a sequence that initiates with the buffer tank having a longest flow distance to the wastewater processing facility.

\* \* \* \* \*